(12) United States Patent
Rothkopf et al.

(10) Patent No.: US 8,872,997 B2
(45) Date of Patent: Oct. 28, 2014

(54) DISPLAY ASSEMBLY

(75) Inventors: Fletcher R. Rothkopf, Los Altos, CA (US); Phillip M. Hobson, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 780 days.

(21) Appl. No.: 13/014,430

(22) Filed: Jan. 26, 2011

(65) Prior Publication Data

US 2012/0050988 A1 Mar. 1, 2012

Related U.S. Application Data

(60) Provisional application No. 61/378,895, filed on Aug. 31, 2010.

(51) Int. Cl.
G02F 1/1333 (2006.01)
H04M 1/02 (2006.01)

(52) U.S. Cl.
CPC .......... *H04M 1/0266* (2013.01); *H04M 1/0277* (2013.01); *H04M 1/0262* (2013.01)
USPC ............................................... 349/60; 349/58

(58) Field of Classification Search
USPC .................................................... 349/58–60
See application file for complete search history.

(56) References Cited

U.S. PATENT DOCUMENTS

| 6,532,152 | B1 * | 3/2003 | White et al. ................. 361/692 |
| 6,813,147 | B2 | 11/2004 | Jeong |
| 7,020,495 | B2 | 3/2006 | Han |
| 7,149,557 | B2 | 12/2006 | Chadha |
| 7,944,520 | B2 * | 5/2011 | Ichioka et al. ................. 349/58 |
| 2002/0065054 | A1 | 5/2002 | Humphreys et al. |
| 2007/0132907 | A1 * | 6/2007 | Kim ............................... 349/58 |
| 2009/0237874 | A1 * | 9/2009 | Prest et al. ............... 361/679.01 |

* cited by examiner

*Primary Examiner* — Bumsuk Won
*Assistant Examiner* — Charles Chang
(74) *Attorney, Agent, or Firm* — Brownstein Hyatt Farber Schreck, LLP

(57) ABSTRACT

A display assembly includes at least a protective cover layer, a display stack that includes a plurality of display components arranged in a plurality of interconnected layers, the display stack providing an imaging service, and a flat support chassis arranged to provide support for the display stack. In the described embodiment, the display stack is positioned between the protective cover layer and the flat support chassis. The display assembly can be disposed within a housing with sides sloping inwards where a portion the display assembly is proximate to the inward sloping sides. To allow the display assembly to fit closer to the edges of the housing, material can be removed from the flat support chassis. For example, edges of the flat support chassis can be chamfered.

18 Claims, 10 Drawing Sheets

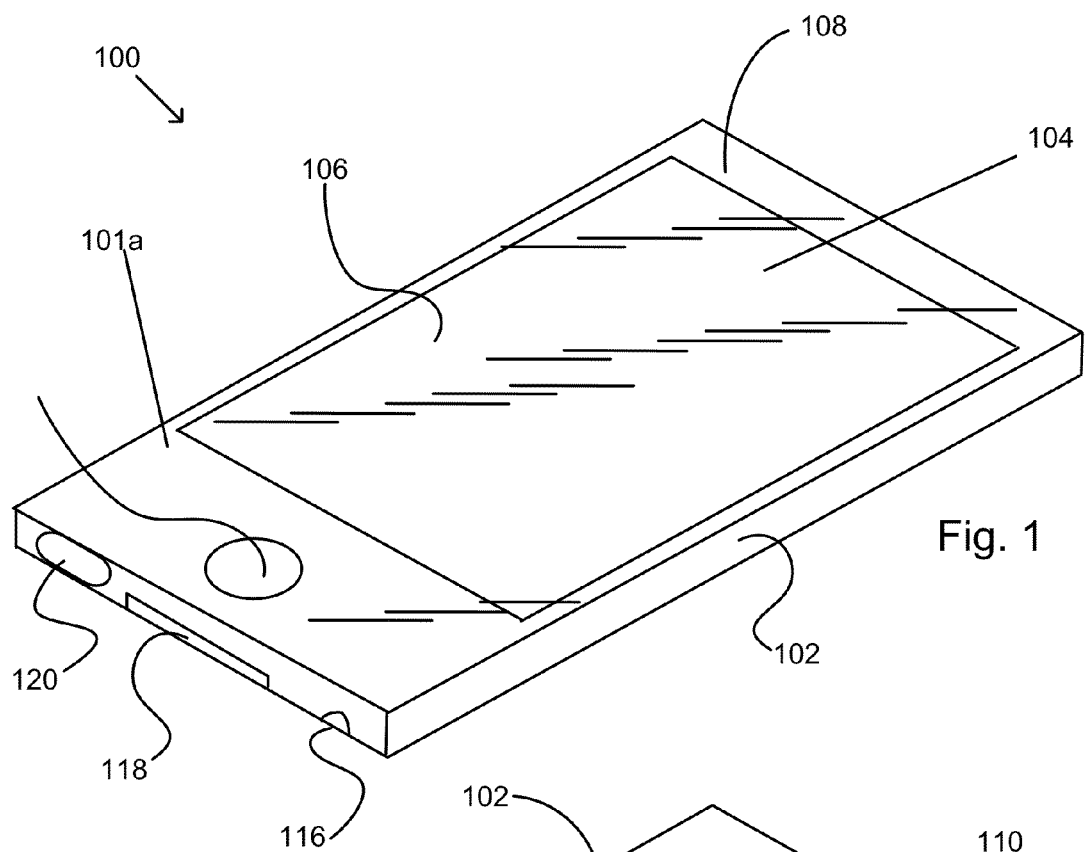
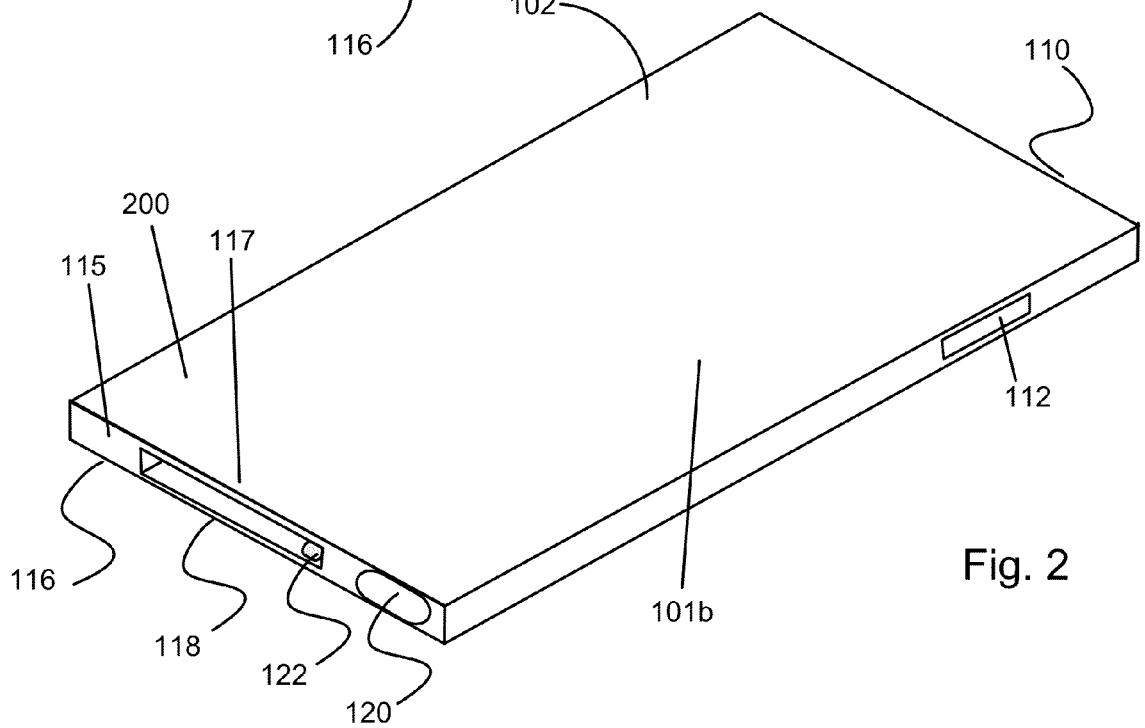

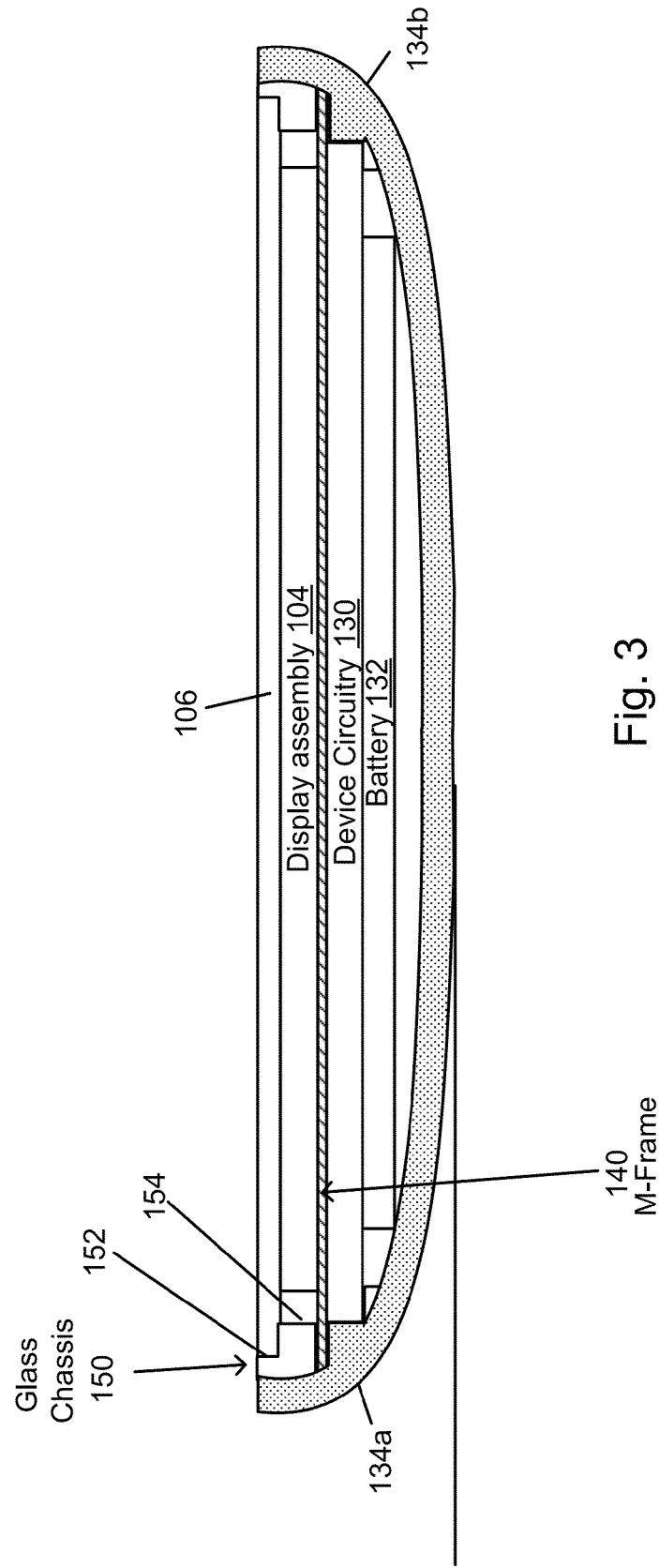

View along Side Edge 172

DISPLAY ASSEMBLY

CROSS REFERENCE TO RELATED APPLICATIONS

This application claims priority under 35 U.S.C. §119(e) from co-pending U.S. Provisional Patent Application No. 61/378,895, filed Aug. 31, 2010, titled "DISPLAY ASSEMBLY," which is incorporated by reference and for all purposes.

TECHNICAL FIELD

The described embodiments relate generally to small form factor electronic devices. More particularly, providing structural support for a display assembly is described.

DESCRIPTION OF THE RELATED ART

From a visual stand point, users often find compact and sleek designs of consumer electronic devices more aesthetically appealing. As an example, portable electronic device designs that are both thin and light-weight are often popular with consumers. The portable electronic devices often include a display. The display can be surrounded by a thin profile enclosure where display components, such as a display controller, display circuitry, display lighting and its associated support structure are all packaged within the enclosure. Within the enclosure that includes the display, besides the display components, other device components such as, a main logic board including a processor and memory, batteries, audio circuitry, speakers and other interface circuitry may also be packaged. The display and other device components can be arranged and secured within the enclosure in a number of stacked layers where each of the layers can be composed of materials with different mechanical and thermal properties.

A few design goals associated with the design of a thin profile device, such as a thin profile device including a display surrounded by a thin-profile enclosure can include 1) a resistance level to bending, 2) adequate heat dissipation, 3) adequate sealing of the device from external contaminants, 4) ease of manufacturability and 5) aesthetical appeal of the enclosure. Bending resistance, which can be obtained by structural rigidity, is important because too much bending can lead to component damage. For instance, display circuitry or the display cover glass break can break as a result of excessive bending. Adequate heat dissipation can be important because electrical components, such as the display circuitry, can fail if exposed to temperatures above their operating limits. Adequate sealing is important because internal circuitry, such as display circuitry, can be susceptible to damage from external contaminants. Ease of manufacturability is important because thin, fragile components may be susceptible to damage during the assembly process. Finally, an aesthetic appeal can be important because it can affect a consumer's desire to purchase a device and their satisfaction with the device after the purchase.

Design challenges arise because design goals, such as the design goals described in the previous paragraph, can often conflict with one another. For instance, components more resistant to bending are usually thicker because resistance to bending moments increases as the thickness of the component increases. As another example, adequate heat dissipation can require adding thermal mass and/or layers of thermally conductive material, which can add to the thickness of the component stack and hence the thickness of the enclosure needed to enclose the component stack. As yet another example, a thin aesthetically appealing design can involve the introduction of curvature to the enclosure to give it a less blocky appearance and a better feel when held. The introduction of curvature, however, can lead to a structure that varies in thickness from its edges to the center. Thus, thickness requirements for components, such as the display, can be affected by a decrease in a thickness of the enclosure in regions of high curvature, such as near the edges of the device.

In view of the above, display component and support structure designs are desired that are suitable for use in an aesthetically appealing thin-profile enclosure with a varying thickness profile.

SUMMARY OF THE DESCRIBED EMBODIMENTS

Broadly speaking, the embodiments disclosed herein describe structural components well suited for use in consumer electronic devices, such as laptops, cell phones, netbook computers, portable media players and tablet computers. In particular, structural components are described that address strength, packaging and thermal issues associated with the design of a light-weight consumer electronic device with a thin and compact housing and an associated thin-profile display. Methods for forming these structural components are also described.

In one embodiment, the consumer electronic device can be a portable electronic device with a thin-profile display assembly that is disposed within a housing with a thin-profile. The display assembly can include at least a protective cover layer, a display stack that includes a plurality of display components arranged in a plurality of interconnected layers, and a flat support chassis arranged to provide support for the display stack. In the described embodiment, the display stack can be positioned between the protective cover layer and the flat support chassis. The display stack can be configured to provide imaging services. In additional, the display stack can include sensors for detecting an interaction of an object with the display, such as a touch input made by a user's finger.

In a particular embodiment, the thin-profile display assembly can be configured for packaging within a thin-profile housing with regions of high-curvature near its edges resulting in thickness changes from the edges to the center of the housing. In some areas, the display assembly and its associated imaging services can extend into the regions of high-curvature near the housing edges. For instance, a portion of the display assembly can extend to near an edge of the housing. In a particular embodiment, to accommodate a reduction thickness in the high curvature areas and to help align the display assembly close to the edge of housing, material can be removed from the flat support chassis.

As an example, to accommodate thickness changes in the housing near its edges and to help to align the display assembly, the flat support chassis can include chamfered edges. The chamfer angle can depend on the curvature of the enclosure and a shape of the support structure proximate to the flat support chassis. In one embodiment, the display assembly can be surrounded by a first frame arranged around a perimeter of and coupled to the housing. The frame can be used to provide a surface to which the protective cover layer of the display assembly is sealed. The first frame can include a hollowed out portion into which the flat support chassis and portions of the display stack extend. Chamfer parameters, such as the chamfer angle, can be selected to be compatible with the shape of the hollowed out portion into which the display assembly extends.

In another embodiment, a second frame can be coupled to the housing and disposed below the flat support chassis. The second frame can be formed from a thermally conductive material, such as a metal. The second frame can be thermally linked to one or more locations of the display assembly. The second frame can be configured to dissipate thermal energy away from the locations where it is thermally linked to the displayed assembly. The second frame can also be used to provide structural support to the display assembly. Towards this end, the second frame can be coupled to the flat support chassis. For instance, a bonding agent, such as an adhesive tape, can be used to mechanically couple the frame to the flat support chassis at a number of locations. If the bonding agent is thermally conductive, then mechanical support and thermal relief can be provided via the coupling between the second frame and the flat support chassis. The structural support provided by the frame to the display assembly may allow the flat support chassis to be thinned.

Other apparatuses, methods, features and advantages of the described embodiments will be or will become apparent to one with skill in the art upon examination of the following figures and detailed description. It is target that all such additional apparatuses, methods, features and advantages be included within this description be within the scope of and protected by the accompanying claims.

BRIEF DESCRIPTION OF THE DRAWINGS

The described embodiments and the advantages thereof can best be understood by reference to the following description taken in conjunction with the accompanying drawings.

FIGS. 1-2 are perspective diagrams showing various views of fully assembled electronic device in accordance with an embodiment of the invention.

FIG. 3 is a cross-sectional view of an electronic device in accordance with the described embodiments.

DETAILED DESCRIPTION OF REPRESENTATIVE EMBODIMENTS

Figure 4A:
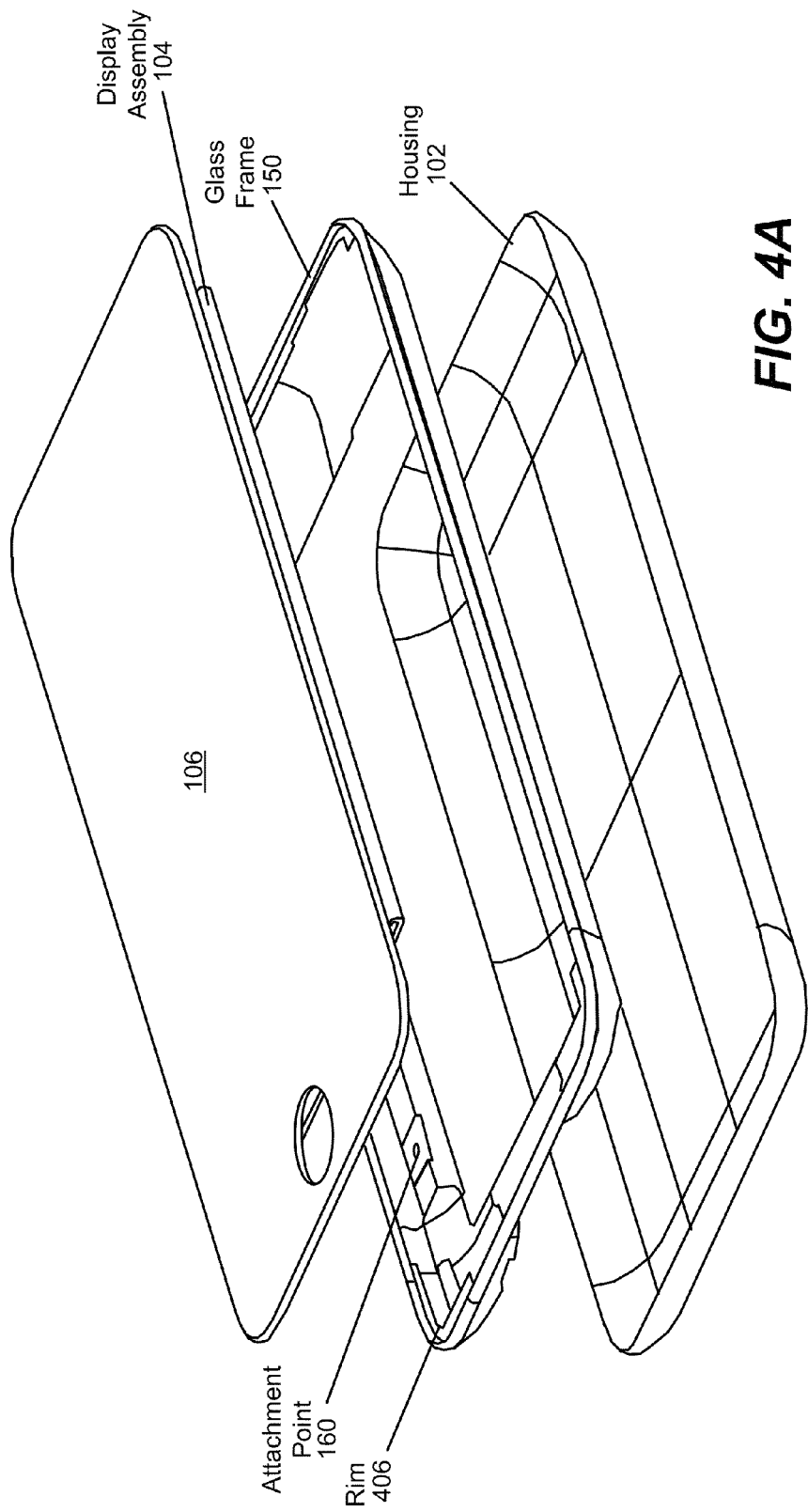
FIG. 4A shows a perspective view of a display assembly, a top glass, a glass frame and housing in accordance with the described embodiments.

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts. Aspects of the described embodiments relate to a small form factor electronic product. For the remainder of this discussion, the small form factor electronic device will be described in terms of a personal media device.

The personal media device can include a housing suitable for enclosing and supporting its various operational components. The housing can include a top and a bottom where the thickness of the housing varies from the top to the bottom. As an example, the thickness of the housing can be become thinner along the sides connecting the top and bottom of the housing. As will be discussed in more details as follows, some device components, such as a display, can extend from a region of greater housing thickness, such as near the center of the housing, into a region of thinner housing thickness, such as near the edges of the housing. In the region of thinner housing thickness, the available packaging volume is decreased, which can affect the design of the support structure and device components that are located in this region. In the following paragraphs, a general description of a personal media device with a housing design that varies in thickness is described and design issues that can arise from the housing design are illustrated. In particular, the effects of the housing shape on the display assembly and its associated support structure are discussed.

In regards to the general description of the personal media device, its housing can be designed to support various input/output mechanisms such as a display, a touch screen interface, volume switches, power buttons, data and power connectors, audio jacks and the like. In addition, device components that connect to the input/output mechanisms and allow the personal media device to operate for its intended functions, such as main logic board, memory and batteries can be packaged within the housing. The exterior of the housing can be sealed such that sensitive electronic circuitry associated the input/output mechanisms and the device components are protected from damaging constituents in the environment, such as moisture.

To accommodate the input/output mechanisms and allow the personal media device to connect to external devices, the housing can include openings. The locations at which the input/output mechanisms are placed and hence where the openings in the housing are placed can be selected to enhance the usability of the interface under conditions for which the device is intended to operate. For instance, for a device intended to be operated with a single hand, the input mechanisms, such as an audio control switch, can be placed at a location that are easily finger operated while the device is held in the palm of the hand. Other output mechanisms, such as an audio jack, can be placed at locations that do not interfere with holding the device, such as on a top edge of the device. In addition to the input/output mechanisms, the internal device components need to be located within the housing. Some flexibility can be afforded in regards to the locations of the internal device components within the housing as long as sufficient space for needed connectors between components is available.

To improve the aesthetics of the personal device, rather than using a blocky, rectangular housing with sharp edges, housing with various curves and thickness changes can be used. As example, rather than using a rectangular box, with a top, bottom and four sides to house the device components, the housing can be designed where the four sides of the rectangular box are replaced with continuous curves from the top to the bottom that eliminates the sharps edges. As another example, rather than using a rectangular box, a wedge-shaped housing can be used to enclose the device components. In both of these housing designs, maximum thickness of the housing may be relatively thin, i.e., the device can be considered as having a thin profile that becomes very thin in certain regions.

In specific embodiments, a display assembly and its associated support structure can extend into portions of the housing that are relatively thinner than surrounding portions. To allow for the overall thinness of the housing and then the narrowing of the housing in certain regions, the design of the display assembly can be modified. In particular, a support chassis for the display assembly can be used that is relatively flat and thin. To accommodate regions where the support chassis extends into the narrower portions of the housing, the support chassis can be modified. For instance, edges of the support chassis can be chamfered to fit into a narrow portion of the housing. These and other embodiments are discussed below with reference to FIGS. 1-8. However, those skilled in the art will readily appreciate that the detailed description given herein with respect to these figures is for explanatory purposes only and should not be construed as limiting.

In particular with respect to FIGS. 1 and 2, a personal media device, including 1) a housing with a top face and a bottom face linked by sidewalls and 2) an illustrative arrangement of device components, is described. With respect to FIGS. 3-4B, arrangements of a display cover glass, display assembly, cover glass support frame, an underlying secondary support frame and a housing are described. The secondary support frame can be used to relieve thermal and/or mechanical loads associated with the display assembly. Further, the secondary support frame can be used as an attachment point for other device components. Different configurations of the secondary support structure are discussed with respect to FIGS. 5A-5C. A cross sectional view of a display assembly extending into a narrower portion of the housing is described with respect to FIGS. 6A-6C. In particular, configurations involving a display assembly with a substantially flat support chassis and modifications to the flat support chassis that allow it to extend into the narrower portion of the housing are discussed. With respect to FIG. 7, a method of generating the personal media device including a display assembly with a flat support chassis and secondary support frame is discussed. Finally, examples functional components used to operate the personal media device are described with respect to FIGS. 8 and 9.

FIGS. 1-2 are perspective diagrams showing various views of fully assembled personal media device 100 in accordance with an embodiment of the invention. The device 100 includes a top face 101a and a bottom face 101b and connected by four sides. In one embodiment (not shown), the four sides can be angled or sloped inwards such that a surface area of the top face 101a is greater than a surface area of the bottom face 101b. Because of the four sides are angled inwards, as the edges of the top face 101a are approached, the thickness of the housing 102 decreases near the edges of the top face. In other embodiments, as are described in more detail below with respect to FIGS. 3-4B and 6A-6C, the housing can include a more continuous shape with a maximum thickness near the center bottom of the device. Thus, the housing is thicker near the center of the device 100 and becomes thinner as the edges of the top face 101a are approached. In yet another example, the sides of the device can be rounded in a continuous shape that transitions into a relatively flat bottom portion of the device 100.

In addition to externally visible variations in the thickness of the device 100 which can affect the available internal volume available for packaging device components, the housing 102 can be thinner and thicker in certain areas. Thus, even if the device 100 was designed with an appearance of a relatively constant thickness from the outside, internally the thickness of the device can vary according to variations in the thickness of the housing 102. Where the housing 102 is thicker, less internal volume can be available for packaging internal components of the device. Thus, the variation in thickness of housing itself can also affect the design of device components for packaging purposes.

Returning to FIG. 1, a cover glass 106 forms an outer surface of the top face 101a. The cover glass 106 can be sealed to the housing 102 such that components within the interior of the device 100 formed by the cover glass 106 and the housing 102. A display 104 occupies a significant portion of an area of the top face. Along portions of the long sides of the top face 101a, edges of the display 104 are close to edges of the top face 101a where the thickness of the device 100 is decreasing. As is described in more detail below, beginning with FIG. 3, the decreasing thickness of the device can affect a design of the internal display assembly for display 104. However, prior to focusing on the display assembly, a general description of the device 100, its functions, and associated components are described to illustrate factors that affect packaging and housing design associated with a personal media device, such as device 100.

Personal media device 100 can be sized for one-handed operation and placement into small areas such as a pocket, i.e., personal media device 100 can be a handheld pocket sized electronic device. By way of example, personal media device 100 can correspond to a computer, media device, telecommunication device and/or the like. Personal media device 100 is capable of processing data and more particularly media such as audio. Personal media device 100 can generally correspond to a music player, game player, video player, personal digital assistant (PDA), and/or the like. With regards to being handheld, personal media device 100 can be operated solely by the user's hand(s), i.e., no reference surface such as a desktop is needed. In some cases, the handheld device is sized for placement into a pocket of the user. By being pocket sized, the user does not have to directly carry the device and therefore the device can be taken almost anywhere the user travels (e.g., the user is not limited by carrying a large, bulky and heavy device).

Personal media device 100 can be widely varied. In some embodiments, personal media device 100 can perform a single function (e.g., a device dedicated to playing and storing media) and, in other cases, the personal media device can perform multiple functions (e.g., a device that plays/stores media, receives/ transmits telephone calls/text messages/internet, and/or performs web browsing). Personal media device 100 is capable of communicating wirelessly (with or without the aid of a wireless enabling accessory system) and/or via wired pathways (e.g., using traditional electrical wires). In some embodiments, personal media device 100 can be extremely portable (e.g., small form factor, thin, low profile, lightweight). Personal media device 100 can even be sized for one-handed operation and placement into small areas such as a pocket, i.e., personal media device 100 can be a handheld pocket sized electronic device. Personal media device 100 can correspond to an electronic device, such as an iPod,™ iPad,™ or an iPhone™ available by Apple Inc. of Cupertino, Calif. Further, the embodiments described herein can be applicable to a personal media device with a multi-part housing, such as an MacBook™ available by Apple Inc.

Personal media device 100 can include housing 102 configured to at least partially enclose any suitable number of components associated with personal media device 100. For example, housing 102 can enclose and support internally various electrical components (including integrated circuit chips and other circuitry) to provide computing operations for the device. The integrated circuit chips and other circuitry can include a microprocessor, memory, a battery, a circuit board, I/O, various input/output (I/O) support circuitry and the like. Although not shown in this figure, housing 102 can define a cavity within which the components can be positioned and housing 102 also can physically support any suitable number of mechanisms, within housing 102 or within openings through the surface of housing 102.

In addition to the above, housing 102 can also define at least in part the outward appearance of personal media device 100. That is, the shape and form of housing 102 can help define the overall shape and form of personal media device 100 or the contour of housing 102 can embody the outward physical appearance of personal media device 100. Any suitable shape can be used. In some embodiments, the size and shape of housing 102 can be dimensioned to fit comfortably within a user's hand. In some embodiments, the shape includes a slightly curved back surface and highly curved side surfaces. Housing 102 is integrally formed in such as way as to constitute is a single complete unit. By being integrally formed, housing 102 has a seamless appearance unlike conventional housings that include two parts that are fastened together thereby forming a reveal, a seam there between. That is, unlike conventional housings, housing 102 does not include any breaks thereby making it stronger and more aesthetically pleasing. Housing 102 can be formed of any number of materials including for example plastics, metals, ceramics and the like. In one embodiment, housing 102 can be formed of stainless steel in order to provide an aesthetic and appealing look and feel as well as provide structural integrity and support for all sub-assemblies installed therein. When metal, housing 102 can be formed using conventional collapsible core metal forming techniques well known to those skilled in the art.

Personal media device 100 also includes cover 106 that includes a planar outer surface. The outer surface can for example be flush with an edge of the housing wall that surrounds the edge of the cover. Cover 106 cooperates with housing 102 to enclose personal media device 100. Although cover 106 can be situated in a variety of ways relative to the housing, in the illustrated embodiment, cover 106 is disposed within and proximate the mouth of the cavity of housing 102. That is, cover 106 fits into an opening 108. In an alternate embodiment, cover 106 can be opaque and can include touch sensing mechanism that forms a touch pad. Cover 106 can be configured to define/carry the user interface of personal media device 100. Cover 106 can provide a viewing region for display assembly 104 used to display a graphical user interface (GUI) as well as other information to the user (e.g., text, objects, and graphics). Display assembly 104 can be assembled and contained within housing 102. Such user input events can be used for any number of purposes, such as resetting personal media device 100, selecting between display screens presented on display assembly 104, and so on. In one embodiment, cover 106 is a protective top layer of transparent or semitransparent material (clear) such that display assembly 104 is visible there-through. That is, cover 106 serves as a window for display assembly 104 (i.e., the transparent cover overlays the display screen). In one particular embodiment, cover 106 is formed from glass (e.g., cover glass), and more particularly highly polished glass. It should be appreciated, however, that other transparent materials such as clear plastic can be used.

The viewing region can be touch sensitive for receiving one or more touch inputs that help control various aspects of what is being displayed on the display screen. In some cases, the one or more inputs can be simultaneously received (e.g., multi-touch). In these embodiments, a touch sensing layer (not shown) can be located below the cover glass 106. The touch sensing layer can for example be disposed between the cover glass 106 and the display assembly 104. In some cases, the touch sensing layer is applied to display assembly 104 while in other cases the touch sensing layer is applied to the cover glass 106. The touch sensing layer can for example be attached to the inner surface of the cover glass 106 (printed, deposited, laminated or otherwise bonded thereto). The touch sensing layer generally includes a plurality of sensors that are configured to activate as the finger touches the upper surface of the cover glass 106. In the simplest case, an electrical signal is produced each time the finger passes a sensor. The number of signals in a given time frame can indicate location, direction, speed and acceleration of the finger on the touch sensitive portion, i.e., the more signals, the more the user moved his or her finger. In most cases, the signals are monitored by an electronic interface that converts the number, combination and frequency of the signals into location, direction, speed and acceleration information. This information can then be used by the personal media device 100 to perform the desired control function relative to display assembly 104.

Personal media device 100 can also include one or more switches including power switches, volume control switches, user input devices and the like. Power switch 110 can be configured to turn personal media device 100 on and off, whereas volume switches 112 is configured to modify the volume level produced by the personal media device 100. Personal media device 100 can also include one or more connectors for transferring data and/or power to and from personal media device 100. For example, opening 115 can accommodate audio jack 116 whereas opening 117 can accommodate data/power connector 118. Audio jack 116 allows audio information to be outputted from personal media device 100 by way of a wired connector whereas connector 118 allows data to be transmitted and received to and from a host device such as a general purpose computer (e.g., desktop computer, portable computer). Connector 118 can be used to upload or down load audio, video and other image data as well as operating systems, applications and the like to and from personal media device 100. For example, connector 118 can be used to download songs and play lists, audio books, photos, and the like into the storage mechanism (memory) of personal media device 100. Connector 118 also allows power to be delivered to personal media device 100.

Portion 200 of personal media device 100 can include a number of communication features. For example, portion 200 can include at least first audio port 120 that can be used to output a first portion of audible sound generated by an audible sound generator assembly enclosed within housing 102. The audible sound generator assembly can take many forms. In the described embodiment, however, the audible sound generator assembly includes at least a diaphragm arranged to synchronously vibrate with audio signals provided by a processing unit included in personal media device 100. The audio signals can be provided by the processing unit decoding audio data files retained within personal media device 100. Enclosed within connector assembly 118, second audio port 122 can be used to output a remaining portion of the audible sound generated by the audible sound generator assembly. In this way, first audio port 120 and second audio port 122 can cooperatively output the audible sound generated by the audible sound generator assembly. By cooperative it is meant that when, for example, first audio port 120 is blocked or otherwise obstructed (by a finger, clothing, etc.), the placement of second audio port 122 substantially precludes the likelihood that second audio port 122 will also be blocked. Therefore, since first audio port 120 and second audio port 122 share an air path from the audible sound generator to the external environment, when one portion of the air path (that portion associated with first audio port 120, for example) is blocked or otherwise obstructed, at least some of the first portion of audible sound generated by the audible sound generator assembly can be passively re-directed to second audio port 122 thereby substantially preserving an overall perceived sound output level.

FIG. 3 shows a cross-sectional view of a personal media device. In FIG. 3, as compared to FIGS. 1 and 2, the housing 102 is shaped with a substantially continuous curve and does not include a distinct bottom face and sides like the device 100 shown in FIGS. 1 and 2. Nevertheless, like the device 100 in FIGS. 1 and 2, the thickness of the housing 102 of the device in FIG. 3 decreases as the edges of the top face including the cover glass 106 are approached and the device is, thus, thicker in the center than near the edges. Also, the device has components similar to the device 100 described with respect to FIGS. 1 and 2, such as the cover glass 106, display assembly 104 and battery 132.

The type and internal placement the device components selected for the personal media device can affect the design of each component, such as the display assembly 104. In particular, the amount of space allocated to each component in the housing can depend on how many components are to be packaged within the housing 102, their placement and the support structure needed to secure each component within the housing. When possible, it is often desirable to reduce the space occupied by a particular component so that the over-all size of the device, such as its thickness, can be reduced or more space can be allocated to another component to improve the over-all device performance. For instance, reducing the thickness of the display and its associated support structure may allow more space to be allocated to a battery to improve a length of time the device can operate between charges.

With respect to the following paragraphs associated with FIG. 3, the internal placement of device components and related support structure are described. In particular, an illustrative arrangement of the display assembly and its support structure relative to other device components is described. Then, with respect to FIGS. 4A-6C, the support structure more closely associated with the display assembly is described in more detail.

Returning to FIG. 3, housing 102 can enclose various internal device components such as those associated with the user interface that allow personal media device 100 to operate for its intended functions. For the purposes of discussion, the internal device components can be considered to be arranged in a number of stacked layers. For example, a display screen of the display assembly 104 can be located directly below the cover glass 106. In one embodiment, the display screen and its associated display driver circuitry can be packaged together as part of the display assembly 104. Below display assembly 104, device circuitry 130, such as a main logic board or circuitry associated with other components, and a battery 132, which provides power to personal media device 100, can be located.

Internal frame 140, which provides a secondary support structure, can add to the overall stiffness of personal media device 100 by, for example, enhancing an ability to resist bending moments experienced by housing 102. Internal frame 140 can be formed of many strong and resilient materials. For example when internal frame 140 is formed of metal such as stainless steel, internal frame 140 can be referred to as M(etal)-frame 140. M-frame 140 can provide both structural support for personal media device 100 but also act to aid in the transfer of heat generated by the various internal components to the external environment. M-frame 140 can be located below the display assembly 104 and above the device circuitry 130. In this way, M-frame 140 can provide support for various internal components as well as aid in transferring heat from internal components such as display assembly 104.

M-frame 140 can be used as an attachment point for other device components. For example, M-frame 140 can be attached to mounting surface, such as 134a and 134b, on housing 102 via fasteners or using a bonding agent. Then, other device components, such as display assembly 104 can be coupled to M-frame 140 rather than directly to housing 102. One advantage of coupling display assembly 104 to the housing via M-frame 140 is that display 140 can be somewhat isolated from bending moments associated with housing 102, i.e., bending moments generated on the housing can be dissipated into M-frame 140. Isolating the display assembly 104 from bending moments associated with housing 102 can prevent damage to display assembly 104, such as cracking, from occurring.

Figure 6A:
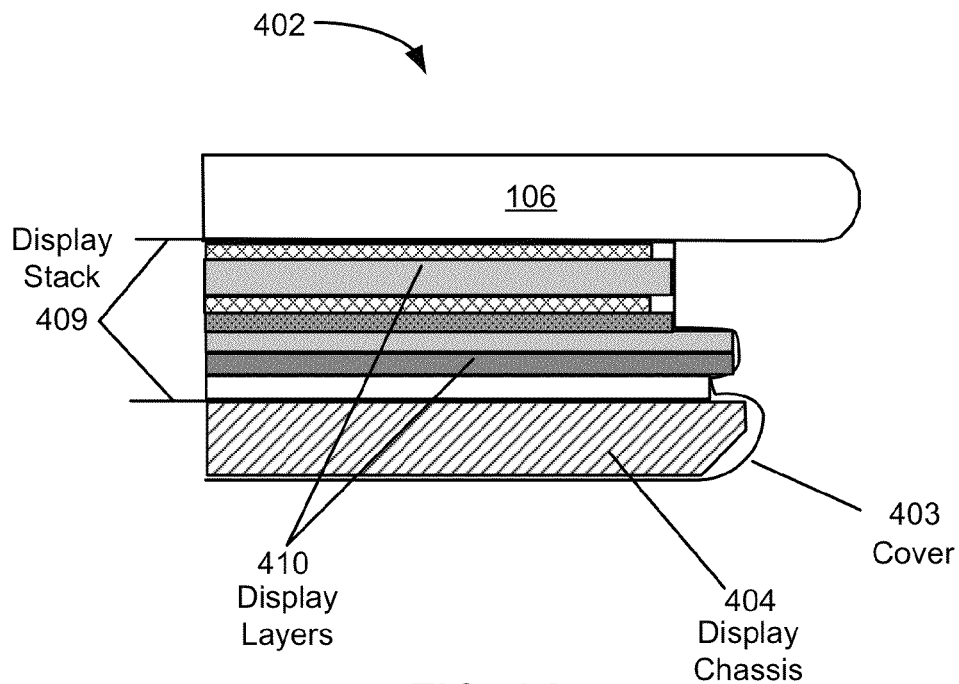
FIG. 6A shows a cross sectional view of a display assembly including a flat support chassis in accordance with the described embodiments.
Figure 6B:
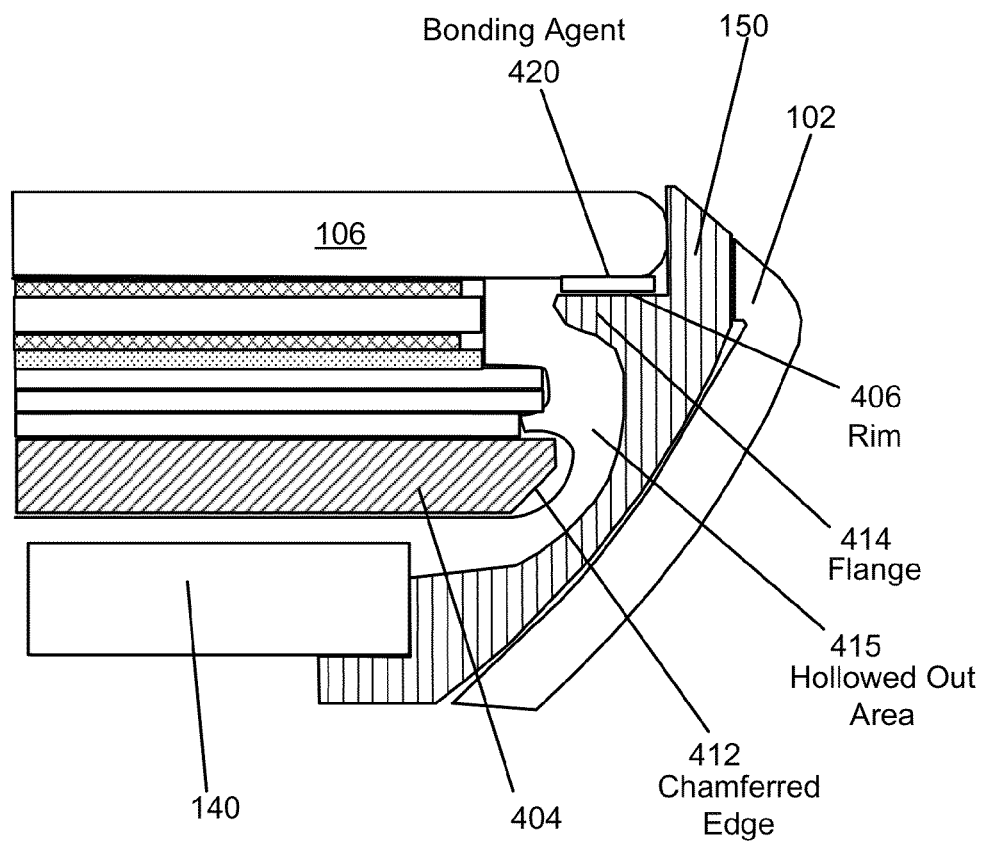
FIG. 6B shows a cross sectional view of a display assembly showing the relationship between the display assembly, it surrounding support structure and the curvature of the housing in accordance with the described embodiments.
Figure 6C:
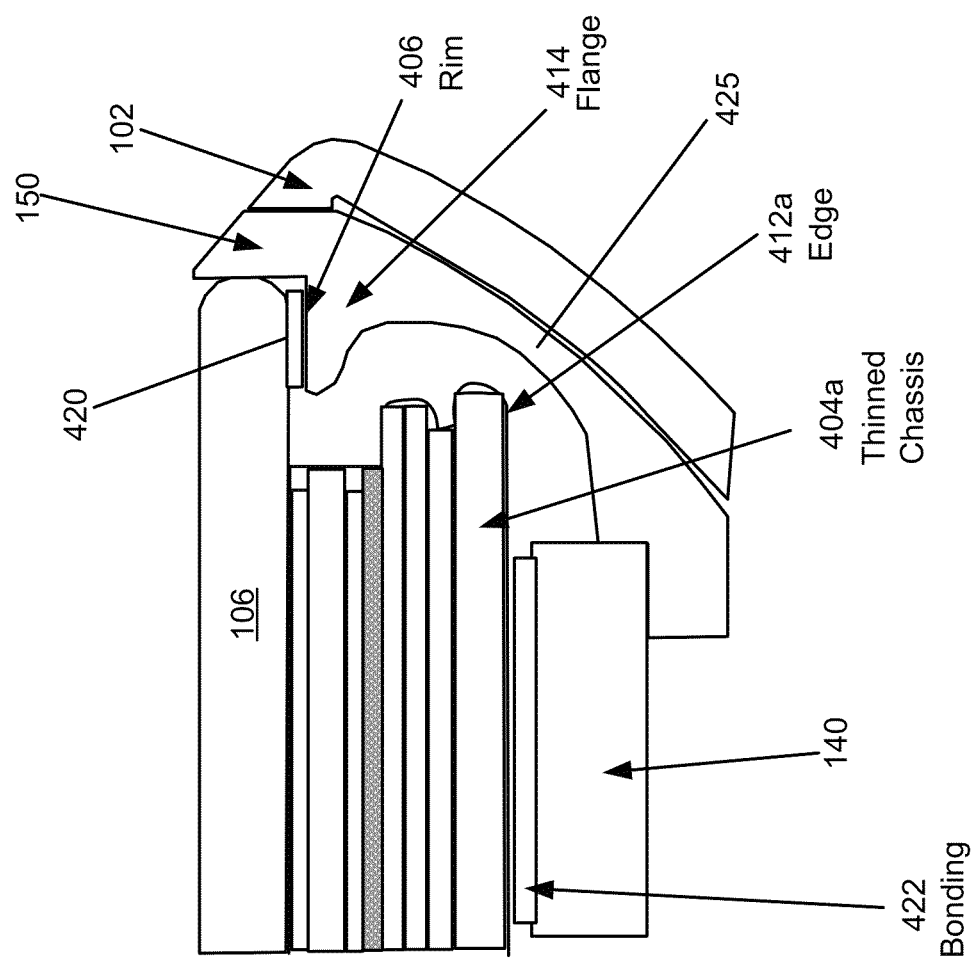
FIG. 6C shows a cross sectional view of a display assembly coupled to a glass frame and a secondary support frame in accordance with the described embodiments.

In one embodiment, described in more detail with respect to FIGS. 6A-6C, the display assembly 104 can include a flat support chassis. The components associated with the display assembly 104, such as the display circuitry can be sandwiched between the flat support chassis and the cover glass 106. M-frame 140 can be coupled to a flat support chassis associated with the display assembly. As is described in more detail with respect to FIG. 6C, coupling the M-frame 140 to the flat support chassis can reduce bending loads to the display assembly and hence allow the thickness of the flat support chassis to be reduced.

It should be noted that in some embodiments, personal media device 100 can include additional internal frames. For example, frame 150 can be affixed directly to housing 102 and generally may act to support cover glass 106. In this regard, frame 150 can be referred to as G(lass)-frame 150. In order to support cover glass 106, G-frame 150 can include rim 152 having flange portion 154 where cover glass 106 is glued to rim 152 about flange 154, thus sealing the entire device. G-frame 150 can be made of an electrically non-conductive frame material, such as a glass filled plastic. One example glass-filled plastic suitable for use in G-frame 150 is KALIX™, manufactured by Solvay Advanced Polymers of Alpharetta, Ga. KALIX™ includes 50% glass-fiber reinforced high-performance nylon. One of ordinary skill in the art will recognize that there are many other potential frame materials that would be suitable for use with this embodiment, and the claims should not be construed as being limited to KALIX™ or any other glass-filled plastic unless expressly stated. An arrangement of the G-Frame 150, M-Frame 140, cover glass 106 and display assembly for one embodiment of a personal media device are described as follows with respect to FIGS. 4A and 4B.

FIG. 4A shows a perspective view of a display assembly 104, a cover glass 106, a glass frame 150 and housing 102. The display assembly 104, which can comprise a number of stacked layers, can be mounted to the top glass (Additional details of the stacked layers of the display assembly are described in more detail with respect to FIGS. 6A-6C.) The glass frame 150 can be designed to fit within an outer perimeter of the housing 102 and mounted to the housing in some manner, such as via a bonding agent(s) and/or the use of fasteners, such as a fastener inserted through attachment point 160. The glass frame 150 can be mounted to the housing such that a seal is formed between the housing and the glass frame 150. The seal can prevent environmental contaminants from reaching an interior of the housing 102 via the interface between the glass frame 150 and housing 102.

The glass frame 150 can include a rim 406. A bottom of the cover glass 106 can be mounted to the top of the rim of the glass frame 150. Thus, the glass frame 150 can provided structural support including resistance to bending to the cover glass 106. The cover glass 106 can be mounted to the glass frame 150 such as a seal is formed between the cover glass 106 and glass frame 150. The seal can provide a barrier that prevents external contaminants, such as moisture for entering into an interior of the housing 102. In this embodiment, when the cover glass 106 and glass frame 150 are mounted to one another and the glass frame 150 is mounted to the housing, the display assembly 106 can "hang" from the bottom of the cover glass 106. As described with respect to FIG. 1, in an assembled position, the cover glass 106 can form the top face of a personal media device.

In various embodiments, the support functions of the glass frame 150 can be integrated into the housing 102. For instance, the housing 102 may include a rim that allows the cover glass 106 to be directly mounted to housing. This feature may allow or a portion of the glass frame to be eliminated. Thus, a separate housing 102 and glass frame 150 is provided for the purposes of illustration only.

Along the long sides of the housing, such as near attachment point 160, the display can be placed close to an edge of the housing 102. In these areas, as a result of the sloped sides, the thickness of the housing 102 decreases as the outer edge of the housing 102 and an outer edge of the cover glass 106 are approached. The decrease in thickness of the housing limits the space available for the glass frame 150 and the display assembly 104. In one embodiment, to allow the display assembly to extend close to the edge of the housing 102, the glass frame can be thinned and/or hollowed out. Further, material can be removed from the display assembly to allow it fit in the available space near the edges of the housing. These embodiments are described in more detail with respect to FIGS. 6A-6C.

Figure 4B:
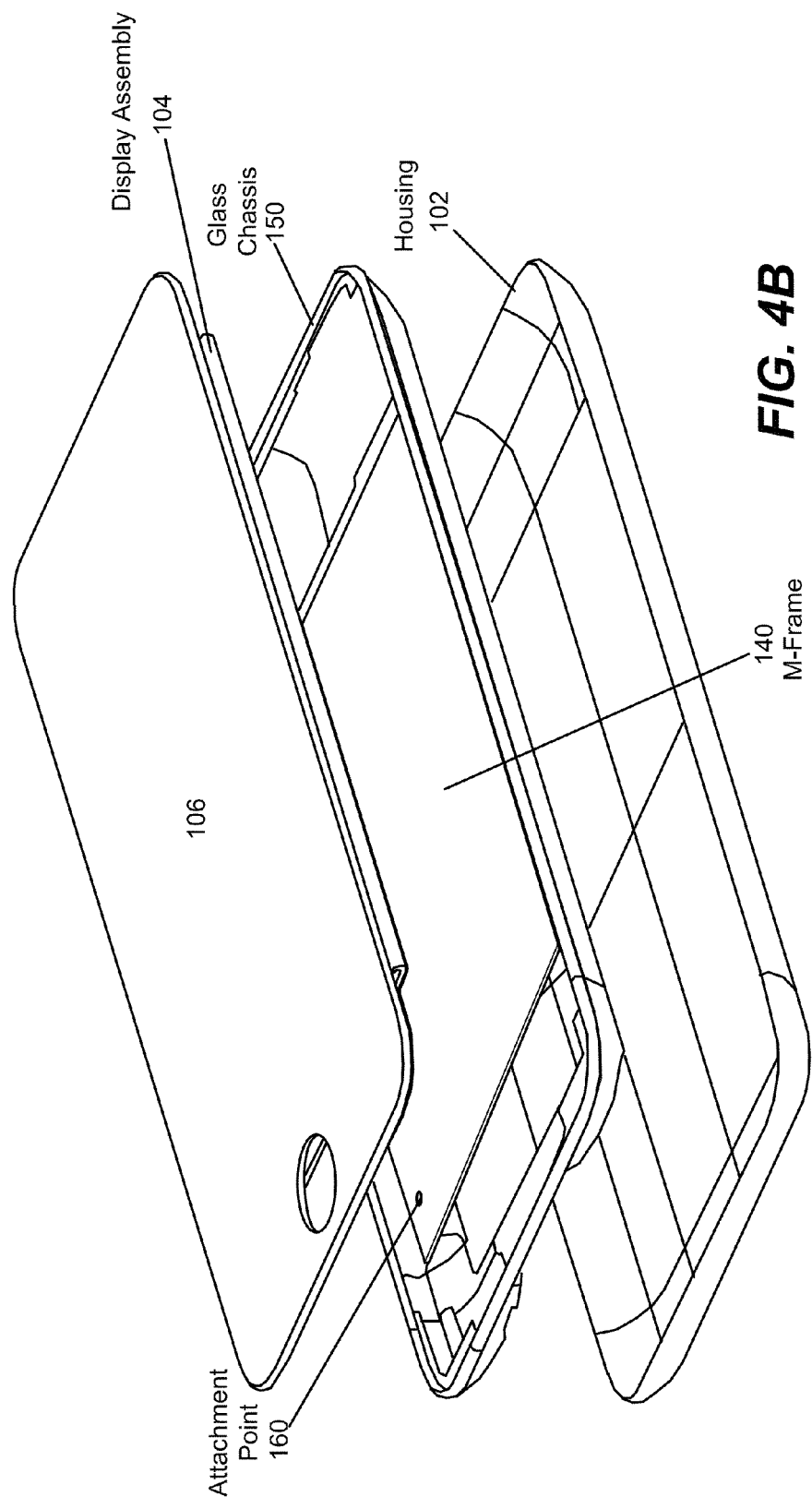
FIG. 4B shows a perspective view of a display assembly, a cover glass, a glass frame and housing and a secondary frame in accordance with the described embodiments.

FIG. 4B shows a perspective view of a display assembly 104, a cover glass 106, the cover glass frame 150, the housing 102 and an M-frame 140. In one embodiment, the M-frame 140 can be disposed below the display assembly 104. The M-frame can be configured to provide thermal and/or structural support to various internal device components including the display assembly. During assembly, the M-frame 140 can be mounted to the glass frame and/or the housing 102. For example, the M-frame 140 can be attached to the housing 102 via a fastener, such as a screw, inserted through the attachment point 160. As another example, the M-frame 140 can be secured to the cover glass frame 150 where the cover glass frame is secured to the housing. In yet another example, the M-frame 140 can be secured to the housing 102 and then the cover glass frame 150 can be secured to the M-frame 140.

In various embodiments, the M-frame can be coupled to the display assembly 104 at a number of locations. A bonding agent selected for the coupling can be selected for thermal and/or mechanical properties. For instance, the M-frame can be used to conduct heat and hence provide thermal relief at different locations on the bottom of the display assembly, such as locations where the display assembly tends to get hot. At these locations, a bonding agent can be used that is thermally conductive so that heat can flow into the M-frame and be conducted away from the local hot spot.

At other locations on the bottom of the display assembly, the M-frame can be used to provide structural support, such as to increase the display assembly's resistance to bending, i.e., structural stiffness. At these locations a bonding agent can be selected that is relatively thermally non-conductive such that a mechanical link is formed but the amount of thermal conduction through the bond is limited. At yet other locations, a bonding agent can be selected for both its mechanical and thermal properties such that structural support and thermal relief is provided. Using such a bonding agent, a bond that provides both structural support for the display assembly 104 and enables thermal conduction of heat into the m-frame 140 from the display assembly 104 can be formed. Further details of forming such bonds are described in more detail with respect to FIGS. 6A-6C. Additional details of the M-frame, such as its shape, are described as follows with respect to FIGS. 5A-5C.

Figure 5A:
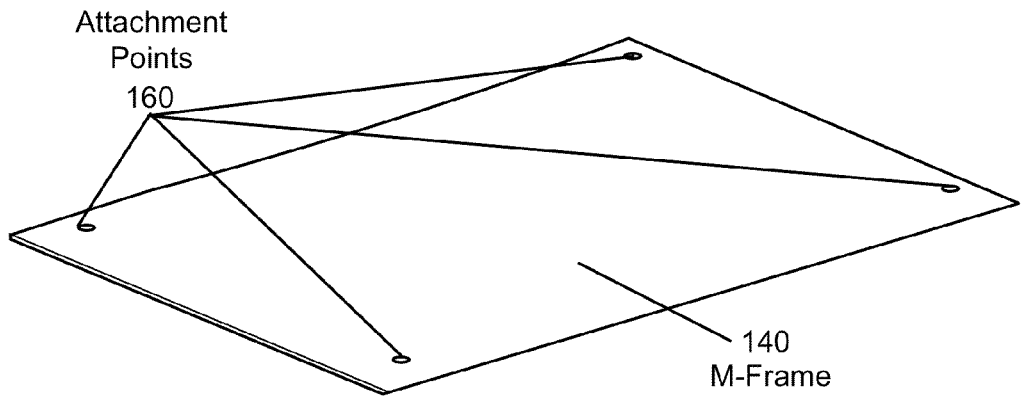
FIGS. 5A-C show perspective and side views of a secondary support frame that can provide mechanical support and thermal relief for a display assembly in accordance with the described embodiments.
Figure 5B:
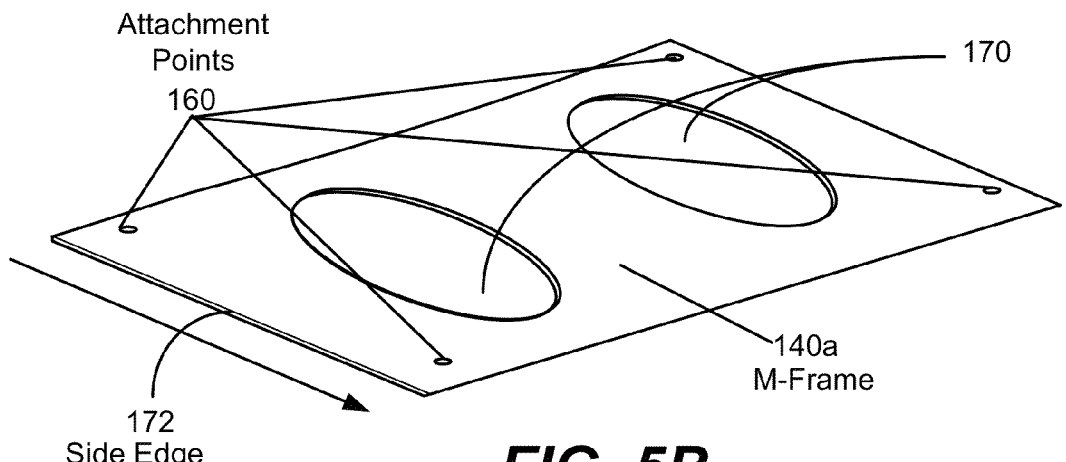
Figure 5C:
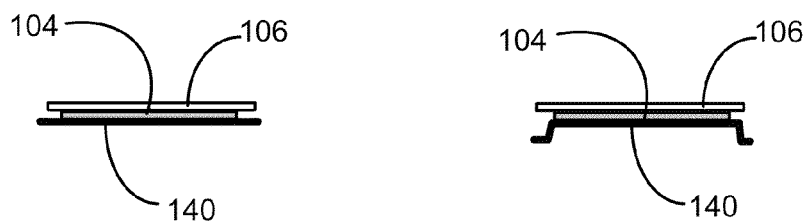

FIGS. 5A-C show perspective and side views of a secondary support frame that can provide mechanical support and thermal relief for a display assembly. As shown in FIG. 5A, in one embodiment, the M-frame 140 can be formed as a substantially flat sheet. The sheet can include a number of attachment points, such as 160, that allow the M-frame 140 to be coupled to the housing 102 and/or the glass frame 150 described above with respect to FIG. 4B. A fastener, such as a screw can be used with the attachment point. In other embodiments, a bonding agent, such as a pressure sensitive adhesive, can be used alone or in conjunction with other types of fasteners for securing the M-frame 140 to another structure, such as the housing 102. Besides attachment points that allow the M-frame 140 to be secured to other structures, the M-frame 140 can also include a number of attachment points (not shown) that allow other device components, such as a main logic board (not shown) to be attached to the M-frame.

In particular embodiments, as is illustrated in FIG. 5B, the M-frame 140a can include a number of apertures, such as apertures 170. In one embodiment, the apertures can be provided to reduce the weight of the M-frame 140. In addition, the apertures can be provided to provide a pathway for data and/or power connectors.

In particular embodiments, an M-frame, such as 140, does not have to be flat. In FIG. 5C, a profile of the M-frame as viewed along the side edge 172 is illustrated. Although, as shown in FIG. 5C, the profile can be flat, the profile can also be raised in different regions. For instance, the M-frame could be attached at one height to the housing and/or the glass frame and then extend upwards so that it can be bonded to a bottom of the display assembly. In other embodiments, the M-frame could be attached at a height greater than a bottom of the display assembly and then extend downwards to allow a bottom portion of the display assembly to be coupled to the M-frame.

With respect to the following figures, additional details of a display assembly including a display stack and a support chassis and their interface to the glass frame, M-frame and housing are described. In particular, details of the display assembly including the support chassis for the assembly are described with respect to FIG. 6A. An example of a display assembly's interface to the housing, glass frame and/or m-frame is described with respect to FIGS. 6B and 6C. In more detail, as described above, with respect to FIG. 4A, in some regions where the display assembly is placed closed to an edge of the housing, the glass frame and the support chassis can be modified to account for the limited space imposed by the decreasing thickness of the housing. These modifications are discussed in more detail with respect to FIG. 6B.

FIG. 6A shows a cross sectional view of a display assembly 402 including a substantially flat support chassis 404. The display assembly 402 can include a display stack, such as 409 with various display layers 410. The display layers can be formed to provide different functions associated with the imaging services generated by the display assembly. For instance, for a liquid crystal display one layer can include the liquid crystals and another layer can include control circuitry associated with the liquid crystals. In another example, one layer can be associated with a light pipe configured to provide back-lighting for the display assembly 402.

Each of the display layers 410 in the display stack 409 can be bonded to one another. The bottom layer in the display stack 409 can be bonded to the display chassis 404 such that the display stack 409 is sandwiched between the display chassis 404 and the cover glass 106. The display chassis 404 as well as the other layers in the display stack 409 can be substantially flat. A protective cover material 403 can be placed over the sides of the display stack 409 and/or the display chassis 404 and bonded to a bottom of the display chassis 404 to protect the display stack 409 from contaminants.

The display chassis 404 can provide structural support for the display assembly 402. In particular, the display chassis 404 can provide structural stiffness and bending resistance. The bending resistance can prevent damage, such as cracking or de-bonding of the various layers in the display stack 409, resulting from an application of a bending moment to the display stack 409. The thickness of the display stack 409 can be sized to resist a certain amount of bending in accordance with desired operational performance objectives, such as drop test requirements.

FIG. 6B shows a cross sectional view of a display assembly showing the relationship between the display assembly, it surrounding support structure and the curvature of the housing. The figure is illustrative of a placement of a display assembly close to the edge of a top surface of personal media with a curved housing (e.g., near attachment point 160 in FIG. 4A.). The housing 102 forms an outer surface for the personal media device and a cover glass 150 frame can be inserted around an interior perimeter of the housing 102 and bonded or attached to the housing in some manner (see FIG. 4A-4B). An additional support structure, frame 140, is disposed below the support chassis 404. As described with respect to FIG. 4B, the M-frame 140 can be configured to provide thermal relief to the display assembly by conducting away excess heat. As is described in more detail with respect to FIG. 6C, the M-frame 140 can also provide structural support to the display assembly that may allow the flat support chassis 402 to be thinned.

The cover glass frame 150 can include a rim 406 to which the cover glass 106 is bonded. The rim can be supported by a flange 414. As described above, rather than using a separate frame, in one embodiment, the rim 406 can be built into the housing 102 and the cover glass 106 can be bonded directly to the housing. For instance, the housing 102 can include a rim and flange for supporting the cover glass.

Because of the inward slope of housing 102, the cover glass frame 150 includes a hollowed out area 415. The hollowed out area 415 allows the display assembly and hence the image services to be extended closer to the top edge of the housing 102. If the portion were not hollowed out, then the edge of the display would have to be set back farther from the top edge of the housing to accommodate the slope of the housing. To fit better into the hollowed out area 415, material can be removed from support chassis 404. For example, one or more edges of the support chasing 404 can be chamfered to fit better into the hollowed area 414. In one embodiment, the chamfer angle can be selected to proximately match the slope of the hollowed out area proximate to the edge of the support chassis.

FIG. 6C shows a cross sectional view of a display assembly coupled to a glass frame and a secondary support frame. In 6C, the support chassis 404a is bonded via a bonding agent to the M-frame 140. The bond is designed to allow structural stiffness associated with the M-frame to be transferred to the support chassis 404a and increase the display assembly's resistance to bending. In one embodiment, with the bonding to the M-frame 140, the support chassis 404a can be made thinner. To illustrate this feature, the support chassis 404a is shown as being thinner the support chassis 404 shown in FIG. 4B. As noted above, besides structural support, the M-frame may also provide thermal relief to the display assembly in locations where the display assembly tends to get hot.

Figure 7:
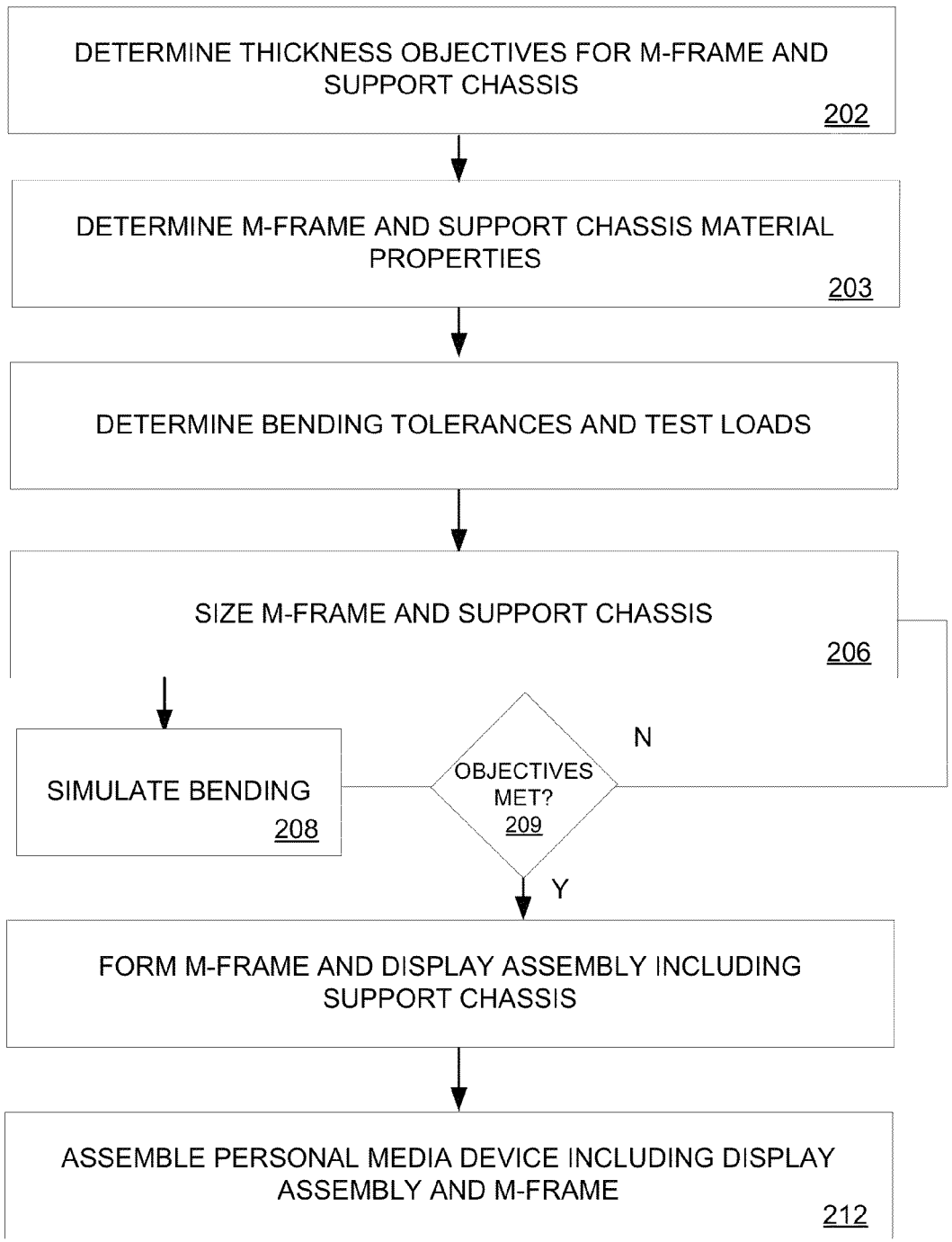
FIG. 7 is a flow chart of a method of generating a support chassis for a display assembly in accordance with the described embodiments.

FIG. 7 is a flow chart of a method 200 of forming a support chassis for a display assembly. In 202, thickness objectives can be determined for the support chassis for the display assembly and the M-frame. In 203, material properties for the M-frame and support chassis can be selected, i.e., the materials used to form each component. In 204, bending tolerances and test loads can be selected 204. In 206, the M-frame and the display chassis can each be sized such that a proximate thickness for each of the components is determined.

In 208, bending and associated bending moments can be simulated based upon the test loads and conditions select in 204. Based upon the simulations, the amount of bending can be compared to the bending tolerances selected in 204. If the thickness objectives are not met, then the M-frame and the support chassis can be resized in 206 and the simulations repeated until thickness objectives are met. This process can be repeated using different materials for the M-frame and the display support chassis. In 210, an M-frame and display assembly including the support chassis can be formed according to the sizes determined in 206. In 212, a personal media device utilizing the M-frame and the display assembly can be assembled.

Figure 8:
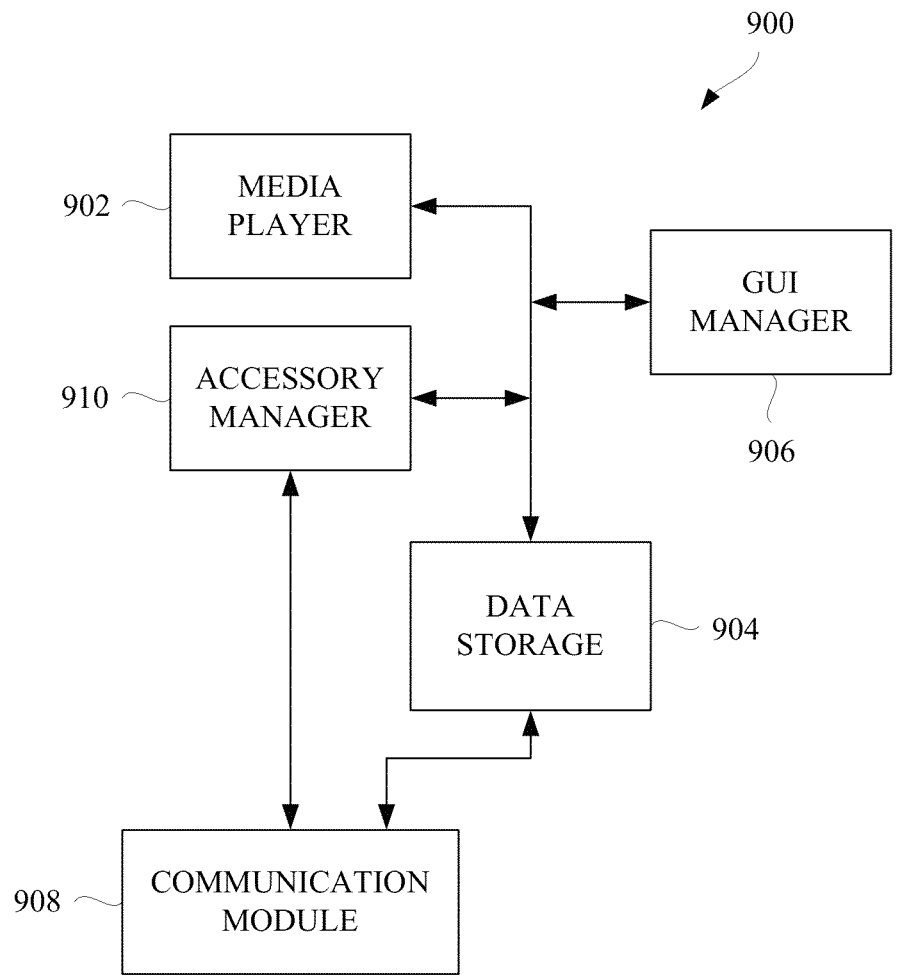
FIG. 8 is a block diagram of an arrangement of functional modules utilized by a portable electronic device in accordance with the described embodiments.

FIG. 8 is a block diagram of an arrangement 900 of functional modules utilized by a portable media device. The portable media device can, for example, be portable media device 102 illustrated in FIGS. 1 and 2. The arrangement 900 includes a media player 902 that is able to output media for a user of the portable media device but also store and retrieve data with respect to data storage 904. The arrangement 900 also includes a graphical user interface (GUI) manager 906. The GUI manager 906 operates to control information being provided to and displayed on a display device. The arrangement 900 also includes a communication module 908 that facilitates communication between the portable media device and an accessory device. Still further, the arrangement 900 includes an accessory manager 910 that operates to authenticate and acquire data from an accessory device that may be coupled to the portable media device.

Figure 9:
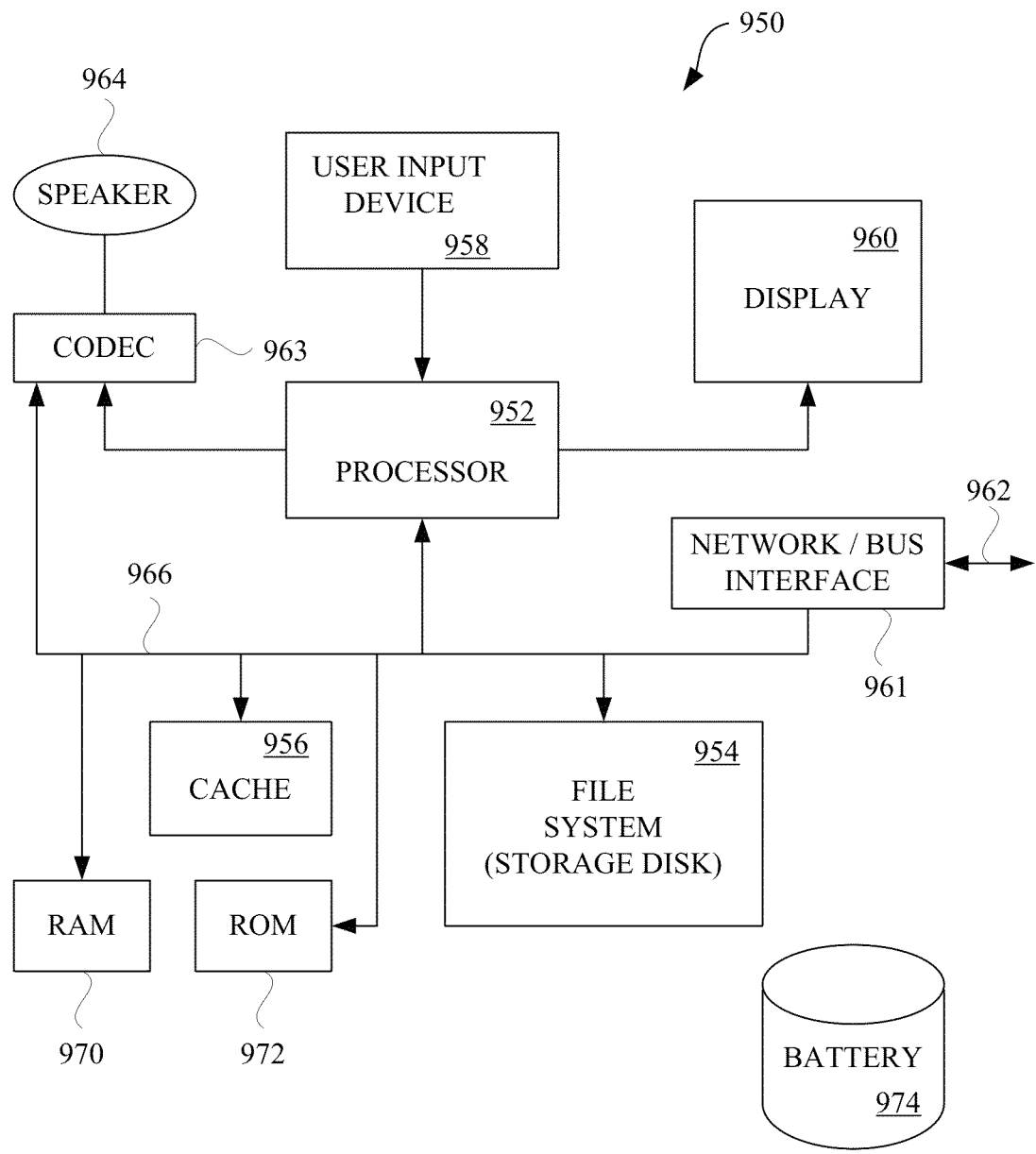
FIG. 9 is a block diagram of a portable electronic device suitable for use with the described embodiments.

FIG. 9 is a block diagram of a media player 950 suitable for use with the described embodiments. The media player 950 illustrates circuitry of a representative portable media device. The media player 950 can include a processor 952 that pertains to a microprocessor or controller for controlling the overall operation of the media player 950. The media player 950 can be configured to store media data pertaining to media items in a file system 954 and a cache 956. The file system 954 can be implemented using a memory device, such as a storage disk, a plurality of disks or solid-state memory, such as flash memory.

The file system 954 typically can be configured to provide high capacity storage capability for the media player 950. However, to improve the access time to the file system 954, the media player 950 can also include a cache 956. As an example, the cache 956 can be a Random-Access Memory (RAM) provided by semiconductor memory. The relative access time to the cache 956, such as a RAM cache, can be substantially shorter than for other memories, such as flash or disk memory. The cache 956 and the file system 954 may be used in combination because the cache 956 may not have the large storage capacity of the file system 954 as well as non-volatile storage capabilities provided by the memory device hosting the file system 954.

Another advantage of using a cache 956 in combination with the file system 954 is that the file system 954, when active, consumes more power than does the cache 956. The use of cache 956 may decrease the active time of the file system 954 and hence reduce the overall power consumed by the media player. The power consumption is often a concern when the media player 950 is a portable media device that is powered by a battery 974.

The media player 950 can also include other types of memory devices. For instance, the media player 950 can also include a RAM 970 and a Read-Only Memory (ROM) 972. In particular embodiments, the ROM 972 can store programs, utilities or processes to be executed in a non-volatile manner. The RAM 970 can be used to provide volatile data storage, such as for the cache 956.

The media player 950 can include one or more user input devices, such as user input device 958 that allow a user of the media player 950 to interact with the media player 950. The user input devices, such as 958, can take a variety of forms, such as a button, keypad, dial, touch screen, audio input interface, video/image capture input interface, input in the form of sensor data, etc. Still further, the media player 950 includes a display 960 (screen display) that can be controlled by the processor 952 to display information to the user. A data bus 966 can facilitate data transfer between at least the file system 954, the cache 956, the processor 952, and the CODEC 963.

In one embodiment, the media player 950 serves to store a plurality of media items (e.g., songs, podcasts, image files and video files, etc.) in the file system 954. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or video content.

When a user desires to have the media player play a particular media item, a list of available media items is displayed on the display 960. Then, using the one or more user input devices, such as 958, a user can select one of the available media items. The processor 952, upon receiving a selection of a particular media item, supplies the media data (e.g., audio file) for the particular media item to one or more coder/decoders (CODEC), such as 963. The CODECs, such as 963, can be configured to produce output signals for an output device, such as speaker 964 or display 960. The speaker 964 can be a speaker internal to the media player 950 or external to the media player 950. For example, headphones or earphones that connect to the media player 950 would be considered an external speaker.

The media player 950 can be configured to execute a number of applications besides media playback applications. For instance, the media player 950 can be configured execute communication applications, such as voice, text, e-mail or video conferencing applications, gaming applications, web browsing applications as well as many other different types of applications. A user can select one or more applications for execution on the media player 950 using the input devices, such as 958.

The media player 950 can include a network/bus interface 961 that couples to a data link 962. The data link 962 allows the media player 950 to couple to a host computer or to accessory devices. The data link 962 can be provided over a wired connection or a wireless connection. In the case of a wireless connection, the network/bus interface 961 can include a wireless transceiver.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A display assembly for a portable electronic device having a housing, comprising:
   a protective cover layer;
   a display stack including a plurality of display components arranged in a plurality of interconnected layers, the display stack providing an imaging service;
   a flat support chassis arranged to provide support for the display stack, wherein the display stack is positioned between the protective cover layer and the flat support chassis, wherein the flat support chassis comprises at least one chamfered edge;
   a support frame positioned within the housing, the support frame supporting the protective cover layer; and
   an internal frame member positioned between the support chassis and the support frame, the internal frame member being generally flat.

2. The display assembly as recited in claim 1, wherein the display assembly protective cover layer is attached to the support frame.

3. The display assembly as recited in claim 1, wherein the chamfered edge has a size and shape in accordance with the support frame.

4. The display assembly as recited in claim 1, wherein the support frame is attached to the housing of the electronic device.

5. The display assembly as recited in claim 1, wherein the flat support chassis is attached to the support frame such that the display assembly is partially isolated from applied loads at the housing.

6. The display assembly as recited in claim 1, wherein the flat support chassis is attached to a support frame wherein the support frame is configured to a) increase a stiffness of the flat support chassis, b) provide heat dissipation for the display assembly or c) combinations thereof.

7. A structural support system for a personal media device comprising:
   a housing formed with a cavity for receiving at least a display assembly including a flat support chassis, the housing including sloped sides such that the housing is thinner near its outer perimeter and thicker near its center;
   a first frame structure including a rim for supporting a protective cover layer, the protective cover layer configured to fit over the cavity and cover the display assembly wherein the first frame structure including a groove proximate to the outer perimeter of housing, the groove configured to receive an outer portion of the flat support chassis; and
   a second frame structure disposed beneath the display assembly, the second frame structure at least thermally coupled to the flat support chassis to provide thermal dissipation of heat generated from the display assembly.

8. The structural support system of claim 7, wherein the first structure is integrally formed into the housing.

9. The structural support system of claim 7, wherein the outer portion of the flat support chassis is chamfered to allow the flat support chassis to be aligned with and fit within the groove of the first structure.

10. The structural support system of claim 7, wherein the display assembly is bonded to the display cover glass.

11. The structural support system of claim 7, wherein the second structure is a substantially flat sheet that spans across the cavity from a first side of the housing to a second side of the housing wherein the flat support chassis is bonded to sheet to increase a stiffness of the display assembly.

12. A personal media device comprising:
   a housing formed with a cavity;
   a display assembly configured to fit within the cavity, the display assembly comprising:
      a protective cover layer;
      a display stack including a plurality of display components arranged in a plurality of interconnected layers, the display stack providing an imaging service; a flat support chassis, the flat support chassis arranged to provide support for the display stack, wherein the display stack is positioned between the protective cover layer and the flat support chassis wherein the protective cover layer configured to fit over a top of the cavity such that the display stack, a main logic board, a memory and a battery are enclosed within a space formed by the protective cover layer and the cavity of the housing;
   a first structure including a rim for supporting the protective cover layer; and
   a substantially flat internal frame member disposed beneath the display assembly and coupled to the housing, the internal frame member coupled to the flat support chassis wherein the internal frame member is configured to increase a stiffness of the display assembly and dissipate heat generated by the display assembly.

13. The personal media device of claim 12, wherein the first structure is formed in the housing proximate to its outer perimeter.

14. The personal media device of claim 12, wherein the first structure includes a groove for receiving an outer portion of the flat support chassis.

15. The personal media device of claim 14, where the outer portion of the flat support chassis is chamfered.

16. A method of forming a personal media device comprising:
   forming a display assembly including a flat support chassis, a protective cover layer and a display stack for providing imaging services disposed between the flat support chassis and the protective cover layer;
   forming a housing including a cavity for receiving the display assembly such that the display stack fits within the cavity;
   forming a structure including a rim for supporting an outer edge of the protective cover layer wherein the structure is coupled to the housing;
   attaching the outer edge of the protective cover layer to the rim;
   providing a substantially flat internal frame member disposed beneath the display assembly and coupled to the housing; and
   coupling the internal frame member to the flat support chassis wherein the internal frame member is configured to increase a stiffness of the display assembly and dissipate heat generated by the display assembly.

17. The method of claim 16, further comprising: forming a groove in the structure for receiving an outer edge of the flat support chassis.

18. The method of claim 17, further comprising: chamfering the outer edge of the flat support chassis to help align and fit the outer edge within the groove.

* * * * *